United States Patent
Fujitani et al.

[11] Patent Number: 5,834,866
[45] Date of Patent: Nov. 10, 1998

[54] MOTOR STRUCTURE

[75] Inventors: Sakae Fujitani; Yuzuru Suzuki; Hiroki Akaoka, all of Shizuoka, Japan

[73] Assignee: Minebea Co., Ltd., Kitasaku-gun, Japan

[21] Appl. No.: 753,188

[22] Filed: Nov. 21, 1996

[30] Foreign Application Priority Data

Dec. 1, 1995 [JP] Japan .................................... 7-313861

[51] Int. Cl.$^6$ .......................... H02K 37/00; H02K 19/02
[52] U.S. Cl. .................. 310/49 R; 310/68 R; 310/67 R; 310/162
[58] Field of Search ................................. 310/49 R, 268, 310/269, 267, 67 R, 68 R, 162, 40 MM

[56] References Cited

U.S. PATENT DOCUMENTS

| | | | |
|---|---|---|---|
| 3,790,834 | 2/1974 | Tanka ....................................... | 310/162 |
| 4,394,594 | 7/1983 | Schmider et al. ..................... | 310/68 R |
| 5,382,853 | 1/1995 | Von Der Heide et al. ........... | 310/67 R |
| 5,463,507 | 10/1995 | Morehouse et al. .................. | 360/97.02 |

Primary Examiner—Clayton E. LaBalle
Assistant Examiner—Timothy Williams
Attorney, Agent, or Firm—Fay, Sharpe, Beall, Fagan, Minnich & McKee

[57] ABSTRACT

This invention provides a two-phase motor which is applicable to a field where high rotation precision is required as in an FDD spindle motor, which requires a low cost, and which can maintain stable characteristics free from magnetic balance fluctuation between the two phases due to assembly. This motor has a ferromagnetic stator having N stator salient poles and a rotor magnet having M poles. N and M are selected to be both even numbers so a relation $N:M=2:2n-1$ (n is a natural number) holds. The N stator salient poles are divided into first and second salient pole groups of N/2 stator salient poles on which windings are concentratedly wound. The stator salient poles belonging to the first and second salient pole groups are alternately arranged in the circumferential direction of the stator. The phases of the windings of the stator salient poles belonging to the first and second salient pole groups are sequentially opposite to each other in the circumferential direction in units of groups. The windings of the stator salient poles belonging to the first and second salient pole groups are sequentially, electrically connected in the circumferential direction in units of groups to respectively form first and second phases, thereby providing a two-phase arrangement.

4 Claims, 7 Drawing Sheets

WINDING(PHASE"A")

FIG. 5B

WINDING(PHASE"B")

MOTOR STRUCTURE

BACKGROUND OF THE INVENTION

1. Field of the Invention

The present invention relates to the structure of a two-phase motor.

2. Description of the Prior Art

Conventionally, a radial gap type two-phase motor is used as a motor for the cooling fan of a power equipment and the like. Although this radial gap type two-phase motor is inexpensive since the ratio of the number of its stator salient poles to the number of poles of its rotor magnet is 1:1, a torque dead point (a position where the torque becomes 0 or decreases extremely even though the motor is excited) exists, leading to a necessity for some structural measure. Even if, however, such a structural measure is taken, a sufficient effect cannot be actually obtained, and the application of this radial gap type two-phase motor is limited to a field where the load torque is small.

A claw-pole stepping motor which is generally employed as a two-phase motor matches the recent digital technology since it performs a stepping operation in accordance with input pulses, and is widely used in positioning and a constant-speed operation. However, this claw-pole stepping motor has drawbacks described in the following items (1) to (3).

(1) The stator portion of a two-phase claw-pole stepping motor is fabricated by stacking two stator shells including a coil and having the same structure on each other in the axial direction. Each stator shell is obtained by three-dimensionally bending a flat metal sheet and forming stator yoke elements on its portion opposing the rotor magnet. To assemble the stator, the two stator shells must be stacked on each other in the axial direction along the central axis and must be positioned at high precision so that they hold a 90° phase relationship in electrical angle with each other.

(2) In the stator assembled as described in item (1), the positional precision of the rotor magnet and the stator (shells) in the axial direction must be ensured so that the rotor magnet magnetically acts equally on the two stator shells.

(3) High-precision positioning is required in the assembly of the motor, as described in items (1) and (2). However, since an inexpensive sleeve bearing is used as the bearing and the clearance in the axial direction is not 0, the rotor portion vibrates in the axial direction along with excitation of the coils (this is particularly notable in single-phase excitation).

Furthermore, because of the recent development in the digital circuit technology including microcomputers, feasibility of applying this inexpensive two-phase stepping motor to, e.g., an FDD (Floppy Disk Drive) spindle motor that requires high rotation precision is attracting attention. In order to actually apply a two-phase stepping rotor to an FDD spindle motor, higher characteristics than in the current state are required, e.g., so-called magnetic balance between two phases must be good, the cogging torque must be small, the rotor portion must not vibrate in the axial direction during excitation, and the like.

To decrease the cogging torque, the distribution of magnetic flux density in the air gap must be adjusted, and the shape of the stator yoke elements of the shell structure must accordingly be changed. However, as far as each stator shell is fabricated by three-dimensionally bending a flat metal sheet, there is a structural limitation to freely changing the distribution of magnetic flux density in the air gap. Also, since the magnetic circuit is three-dimensional (not in one plane) and thus complicated, the magnetic efficiency is poor consequently. Regarding the problem of the vibration of the rotor portion in the axial direction during excitation, the current structure in which phases are formed in the axial direction is a critical defect.

SUMMARY OF THE INVENTION

The present invention has been made in view of the above problems, and has as its object to provide a two-phase motor which is applicable to a field where high rotation precision is required as in an FDD spindle motor, which requires a low cost, and which can maintain stable characteristics free from magnetic balance fluctuation between the two phases due to assembly.

In a claw-pole stepping motor, as described above, stator shells having the same structure are stacked on each other for a count corresponding to the number of phases (two stator shells are stacked in the case of a two-phase motor) to provide, so to speak, a structure in which the phases are formed in the axial direction. This structure is open to difficulty in maintaining the magnetic balance between the two phases, and the magnetic circuit including the stator yokes is formed three-dimensionally. Therefore, even if the magnetic efficiency is to be improved, a fundamental problem arises.

According to the present invention, the principle of a two-phase claw-pole stepping motor which is generally used and has an established driving method is transformed into a planar arrangement of two phases (not an axial arrangement such as stacking phases in the axial direction), and the following arrangement is employed so that the magnetic efficiency of the rotor magnet is increased and the magnetic coupling is improved.

(1) The number N of stator salient poles and the number M of poles of the rotor magnet of the radial gap motor are selected to be both even numbers so a relation $N:M = 2:2n-1$ (n is a natural number) holds.

(2) The N stator salient poles are divided into first and second salient pole groups each of N/2 stator salient poles on which windings are concentratedly wound, and the stator salient poles belonging to the first and second salient pole groups are alternately arranged in a circumferential direction of the stator, so that phases of the windings of the stator salient poles belonging to the first and second salient pole groups are sequentially opposite to each other in the circumferential direction in units of groups.

(3) The windings of the stator salient poles belonging to the first and second salient pole groups are sequentially, electrically connected in the circumferential direction in units of groups to respectively form first and second phases, thereby providing a two-phase arrangement.

Since the above arrangement is employed (whereas the magnetic balance must be adjusted in the conventional motor by considering two factors, i.e., the axial and circumferential directions), adjustment of the magnetic balance is facilitated to increase the magnetic efficiency, and occurrence of vibrations in the axial direction can be prevented.

DETAILED DESCRIPTION OF PREFERRED EMBODIMENT

The preferred embodiment of the present invention will be described with reference to the accompanying drawings. In this embodiment, the present invention is applied to a flat outer rotor type radial-gap spindle motor.

Figure 1:
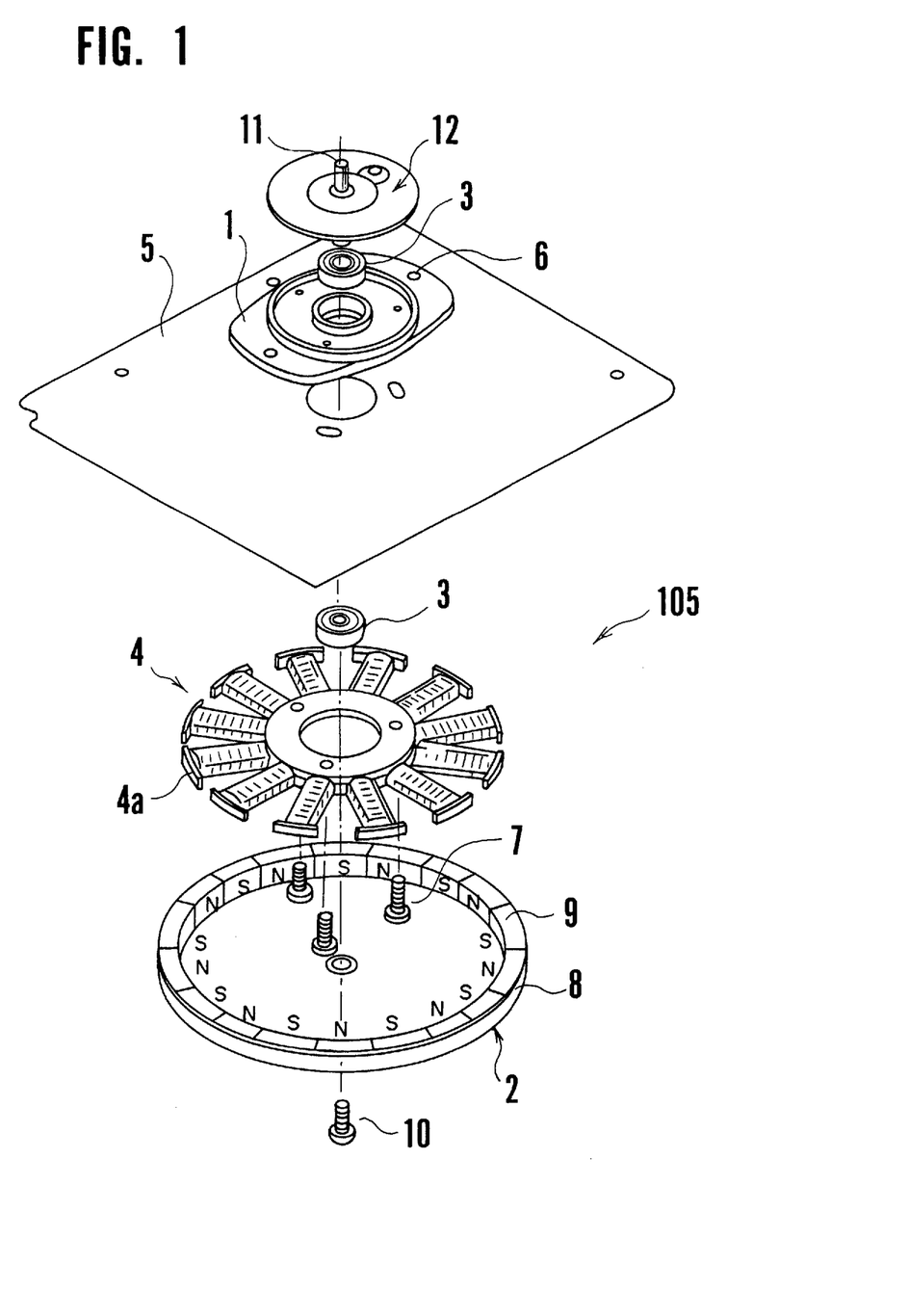
FIG. 1 is an exploded perspective view showing the main part of a motor according to the present invention.

FIG. 1 is an exploded perspective view of the main part of a motor 105 of this embodiment and shows a case of a motor arrangement wherein a number N of stator salient poles 4a is 12 and a number M of poles of a rotor magnet 9 is 18, in other words, the ratio of N to M is N/M=12/18= 2/3, i.e., M/N=2/(2n−1) (n=2).

Referring to FIG. 1, in the motor 105, a stator assembly 4 and a drive circuit plate 5 are fixed to a housing 1 formed by cutting aluminum. Mounting holes 6 for mounting the completed motor 105 are also formed in the housing 1. An insulating layer is formed on one surface of the drive circuit plate 5, and a printed circuit (not shown) is formed on the surface of the insulating layer, thus forming a two-phase sinusoidal wave voltage drive circuit (to be described later) necessary for driving the motor 105. Since the motor 105 is a synchronous motor, rotor position detecting Hall elements for changing over the excitation phase and an FG (frequency generator) for detecting the rotation speed of the rotor are not necessary at all.

Twelve stator salient poles 4a are radially formed in the stator assembly 4. This stator assembly 4 is obtained by stacking and fixing a plurality of electromagnetic steel plates obtained by press punching in the direction of the rotation axis, insulating the 12 stator salient pole 4a portions, and winding wires on these portions.

The drive circuit plate 5 and the stator assembly 4 are fixed to the housing 1 with three stator set screws 7.

A rotor assembly 2 is obtained by adhering a rotor magnet 9, which is magnetized in the radial direction to have 18 poles, on the inner circumferential surface of a ferromagnetic rotor yoke 8. The rotor assembly 2 and a shaft 11 holding a chuck 12 are fixed to each other by fixing a rotor set screw 10 to the shaft 11, and are rotatably supported by two ball bearings 3 inserted in two grooves of the housing 1.

The motor according to the present invention is not limited to an outer rotor type motor, but the present invention can be similarly applied to an inner rotor type motor as well.

The motor drive circuit of this embodiment will be described together with its operating principle with reference to FIG. 2 and FIGS. 3A and 3B.

Figure 2:
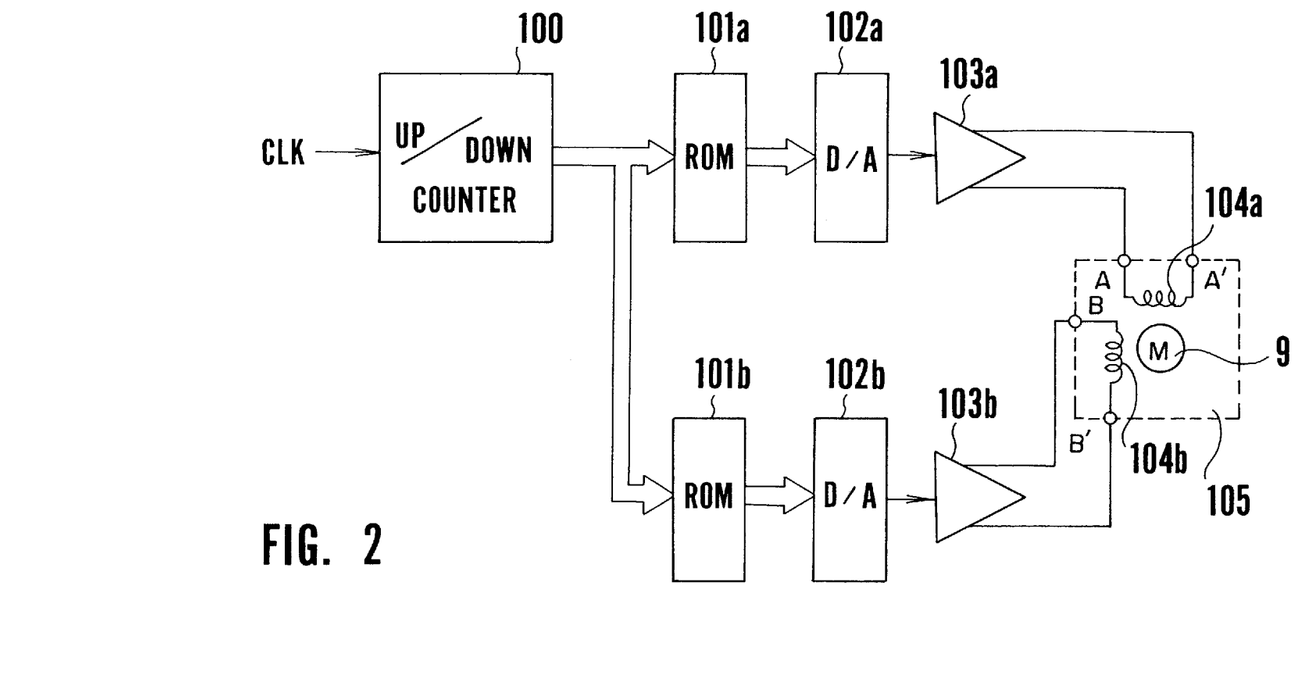
FIG. 2 is a diagram showing an example of the drive circuit of the motor according to the present invention.

FIG. 2 shows an example of a drive circuit that rotates the two-phase motor of the present invention at a constant speed by using the microstep technique. Referring to FIG. 2, an UP/DOWN counter 100 counts clock pulses CLK of a predetermined rate (frequency) to generate address signals to be supplied to ROMs 101a and 101b. The ROMs 101a and 101b output one output value in response to the input address signal.

Figure 3A:
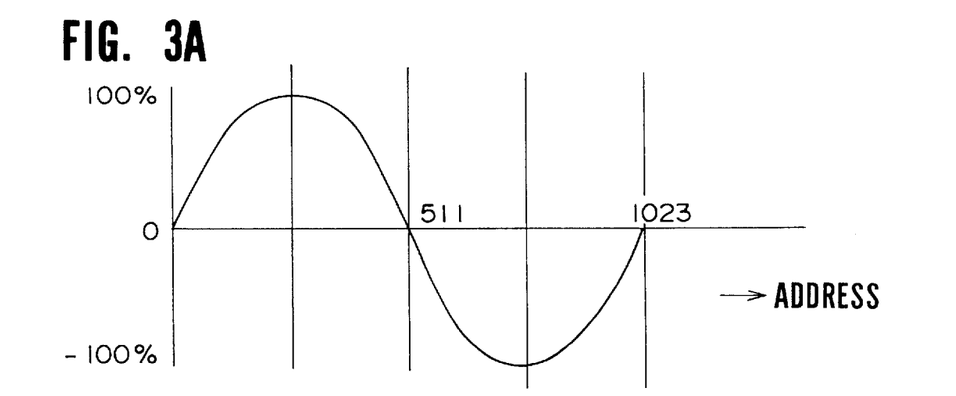
FIGS. 3A and 3B are graphs showing the contents held by ROMS 101a and 101b.
Figure 3B:
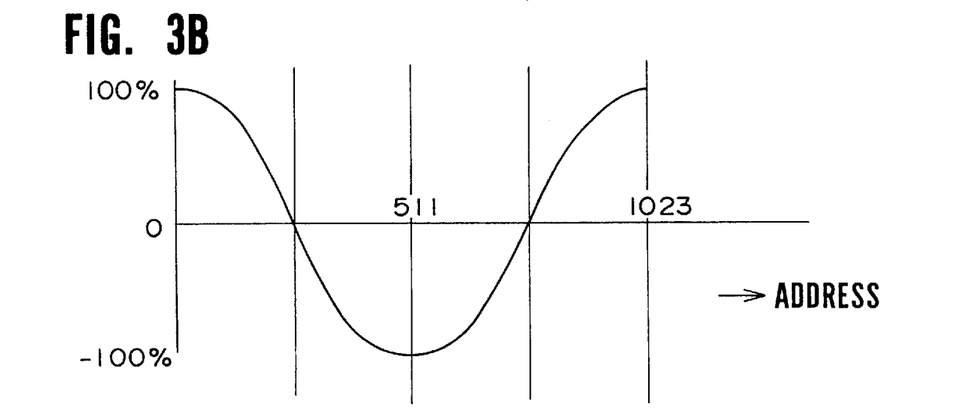

The contents held by the ROMs 101a and 101b are respectively shown in FIGS. 3A and 3B. FIG. 3A shows the content to be output from the ROM 101a in response to the input address signal, and FIG. 3B shows the content to be output from the ROM 101b in response to the input address signal. As shown in FIGS. 3A and 3B, the ROMs 101a and 101b store sinusoidal wave information and cosine wave information, respectively. The contents to be stored in the ROMs 101a and 101b are not strictly limited to the sinusoidal wave information and cosine wave information, respectively. Instead, information obtained by superposing components that compensate for the cogging torque inherent to the motor on the sinusoidal and cosine waves may be more preferably stored in order to improve the rotation precision.

In FIG. 2, reference numerals 102a and 102b respectively denote D/A converters for generating analog voltages in accordance with the outputs from the ROMs 101a and 101b. Power amplifiers 103a and 103b power-amplify small analog signals output from the D/A converters 102a and 102b, and excite motor coils 104a and 104b with outputs from them. In FIG. 2, reference numeral 105 denotes a two-phase motor of the present invention. In the motor 105, a motor coil 104a indicates an A-phase winding (across terminals A—A'), and a motor coil 104b indicates a B-phase winding (across terminals B—B') (the details of the A- and B-phase windings will be described later).

As described above, since the motor coils 104a and 104b constitute two-phase windings, when symmetric two-phase AC voltages are applied to them, as shown in FIGS. 3A and 3B, the two-phase windings are excited to generate a revolving field in the air gap. In synchronism with this revolving field, the rotor magnet 9 receives an attracting (repulsive) force, so that it continues to rotate at a constant synchronous rotation speed.

Figure 4A:
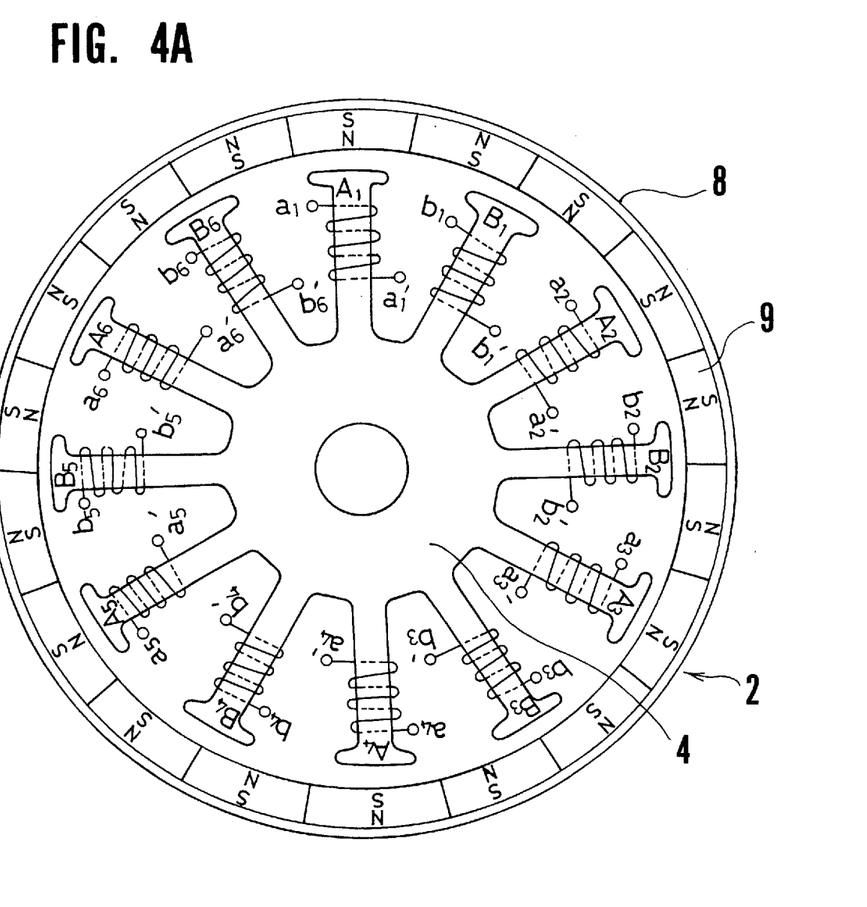
FIG. 4A is a plan view showing the arrangement of the motor according to the present invention.
Figure 4B:
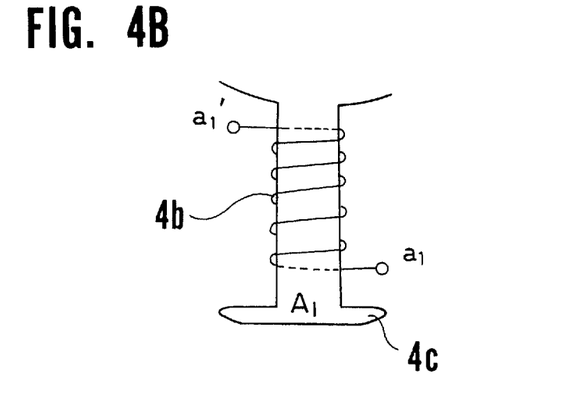
FIG. 4B is an enlarged view of a stator salient pole.

Description will be made on the two-phase windings as the characteristic feature of the present invention by using FIGS. 4A and 4B, FIGS. 5A and 5B, and FIGS. 6A and 6B. FIG. 4A is a plan view showing the arrangement of the motor 105 shown in FIG. 1 to indicate the positional relationship between the stator salient poles 4a and the rotor magnet 9. The respective 12 stator salient poles 4a shown in FIG. 1 are denoted as $A_1$ to $A_6$ and $B_1$ to $B_6$ in FIG. 4A. FIG. 4B is an enlarged view of the stator salient pole $A_1$. As shown in FIG. 4B, a winding 4b is concentratedly wound on the stator salient pole $A_1$, and a salient pole element 4c is provided on the distal end of the stator salient pole $A_1$. This arrangement applies to the remaining stator salient poles. In the respective stator salient poles, each of reference numerals $a_1$ to $a_6$ and $b_1$ to $b_6$ denotes the winding leading end of the corresponding winding 4b, and each of reference numerals $a_1'$ to $a_6'$ and $b_1'$ to $b_6'$ denotes the winding trailing end of the corresponding winding 4b.

The stator salient poles $A_1$ to $A_6$ and $B_1$ to $B_6$ are arranged in the order of $A_1 \rightarrow B_1 \rightarrow A_2 \rightarrow B_2 \rightarrow A_3 \rightarrow B_3 \rightarrow A_4 \rightarrow B_4 \rightarrow A_5 \rightarrow B_5 \rightarrow A_6 \rightarrow B_6$ in the circumferential direction of the stator assembly 4. In FIG. 4A, the windings are wound on the respective stator salient poles in the same direction. In this case, in performing electrical connection, the windings must be connected to change the polarities, as will be described later.

The positional (phase) relationship between the rotor magnet 9 and the respective stator salient poles will be described with reference to FIG. 4A. The centers of the respective salient poles of the stator salient pole A group ($A_1$ to $A_6$) are located at positions to oppose the centers of the magnetic poles of the rotor magnet 9, and the stator salient poles $A_1$, $A_3$, and $A_5$ and the stator salient poles $A_2$, $A_4$, and $A_6$ oppose N and S poles, respectively. Thus, the stator salient poles $A_1$, $A_3$, and $A_5$ and the stator salient poles $A_2$, $A_4$, and $A_6$ have phases opposite to each other, and must be formed to have the opposite phases by means of the electrical connection or the winding directions of the windings 4b (in this embodiment, they are formed to have opposite phases by means of electrical connection; see FIGS. 5A and 5B and FIGS. 6A and 6B).

Similarly, the centers of the respective salient poles of the stator salient pole B group ($B_1$ to $B_6$) are located at positions to oppose the change-over (neutral) points of the magnetic poles of the rotor magnet 9, and the stator salient poles $B_1$, $B_3$, and $B_5$ and the stator salient poles $B_2$, $B_4$, and $B_6$ oppose the change-over points from S poles to N poles and from N poles to S poles, respectively. Thus, the stator salient poles $B_1$, $B_3$, and $B_5$ and the stator salient poles $B_2$, $B_4$, and $B_6$ have poles opposite to each other, and must be formed to have the opposite phases by means of the electrical connection or the winding directions of the windings 4b.

Figure 5A:
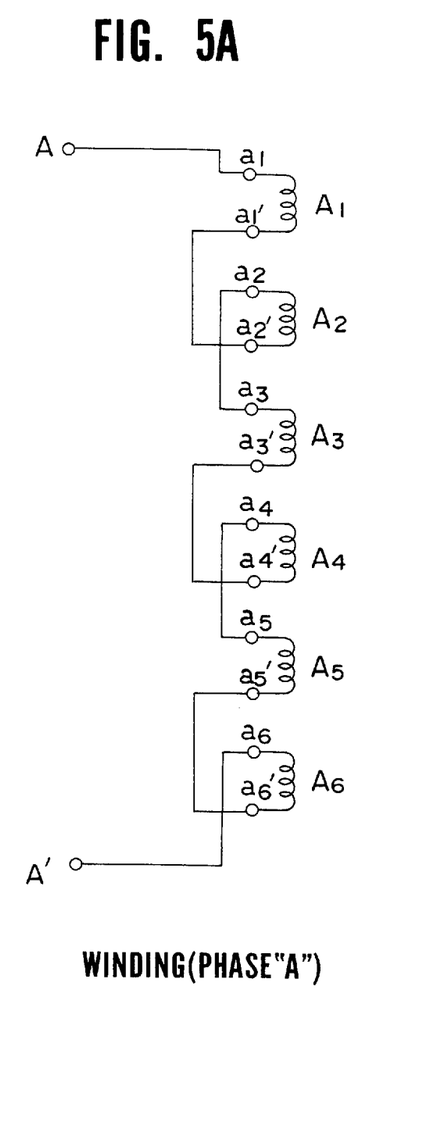
FIGS. 5A and 5B are diagrams showing connection of the windings of stator salient poles.
Figure 5B:
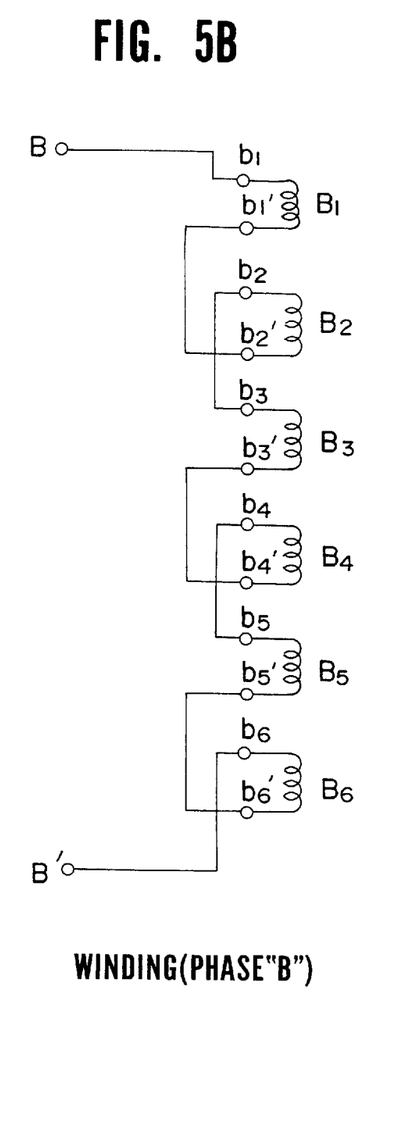
Figure 6A:
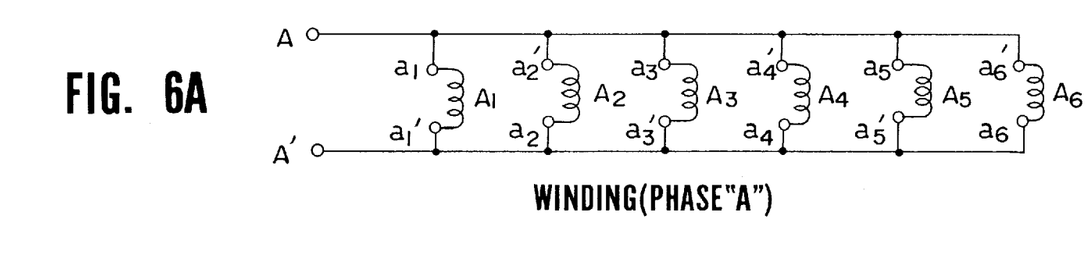
FIGS. 6A and 6B are diagrams showing connection of the windings of stator salient poles.
Figure 6B:
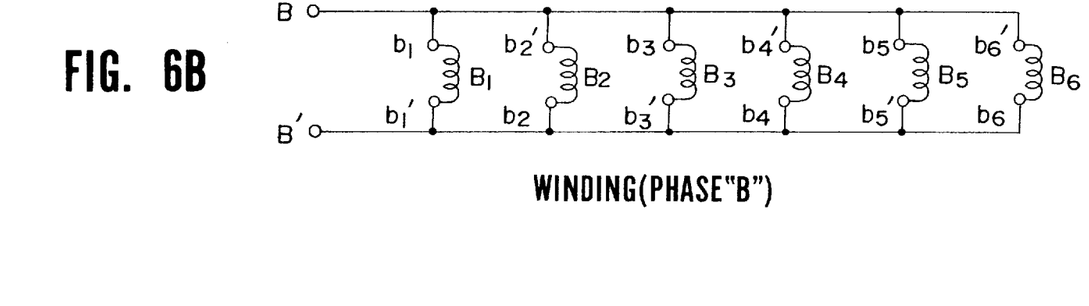

FIGS. 5A and 5B show the connection of the windings of the stator salient pole A group across the terminals A—A' shown in FIG. 2, and FIGS. 6A and 6B show the connection of the windings of the stator salient pole B group across; the terminals B—B' shown in FIG. 2. FIGS. 5A and 5B show the case of series connection, and FIGS. 6A and 6B show the case of parallel connection.

The stator salient pole A group and the stator salient pole B group hold a 270° (−90°) phase relationship in electrical angle with each other, and are arranged to be 90° out of phase from each other. Hence, as shown in FIGS. 5A and 5B or FIGS. 6A and 6B, the respective windings of the stator salient pole A group are connected across the terminals A—A' to form an A-phase winding and the respective windings of the stator salient pole B group are connected across the terminals B—B' to form a B-phase winding, so that the windings of the respective salient poles form two-phase windings as a whole. At this time, the numbers of turns of the windings of the respective stator salient poles must be equal by considering the balance between the phases.

The winding leading ends ($a_1$ to $a_6$, $b_1$ to $b_6$) and the winding trailing ends ($a_1'$ to $a_6'$, $b_1'$ to $b_6'$) of the windings of the respective salient poles are connected such that the directions of the current are opposite to each other between the stator salient poles $A_1$, $A_3$, and $A_5$ and the stator salient poles $A_2$, $A_4$, and $A_6$ (or between the stator salient poles $B_1$, $B_3$, and $B_5$ and the stator salient poles $B_2$, $B_4$, and $B_6$). (As described above, the connection can be made by changing the winding directions such that the directions of the current become opposite to each other.) As a result, the polarities of the respective salient poles when the current is supplied to the windings can be changed.

The relationship between the number N (12 in this embodiment) of stator salient poles and the number M (18 in this embodiment) of poles of the rotor magnet of the motor according to the present invention will be described.

In this embodiment, a relation N:M=2:3 holds. In general, if N and M are even numbers and N:M=2:2n−1 (n is a natural number), the phase relationship described above between the stator salient poles and the rotor magnet is maintained. Therefore, it suffices if two-phase windings are formed by electrically connecting the windings of the respective stator salient poles in this manner.

It follows from the foregoing that there are an infinite number of combinations of the number N of stator salient poles and the number M of poles of the rotor magnet, but an optimum combination exists naturally. This will be described with reference to FIG. 7.

Figure 7:
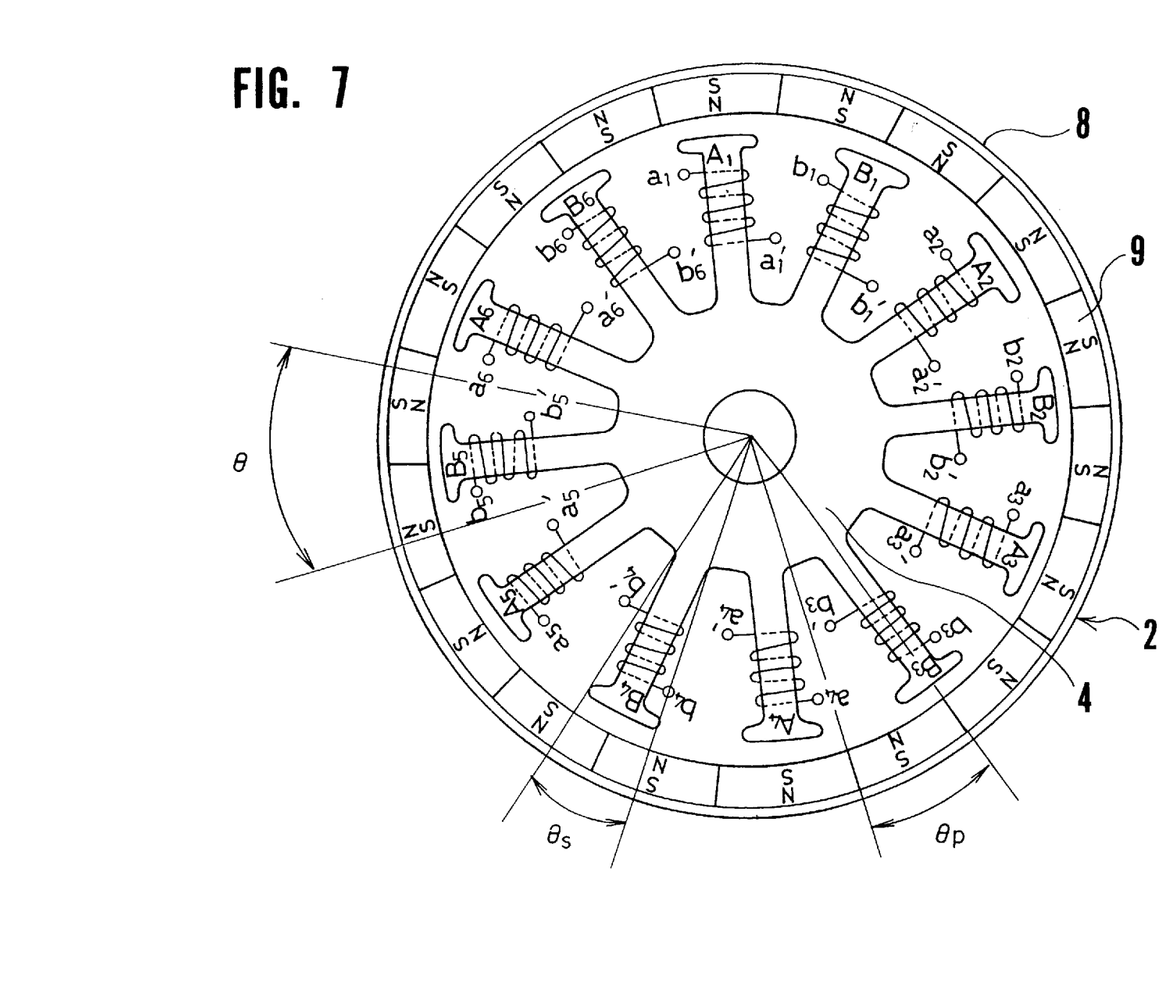
FIG. 7 is a view planarly showing the arrangement of the motor according to the present invention.

FIG. 7 is identical to FIG. 4A except that space angles θ, $θ_S$, and $θ_P$ are added. θ is the central angle occupied by one stator salient pole, which is 360°/12=30° in this embodiment. $θ_P$ is the central angle occupied by one pole of the rotor magnet, which is 360°/18=20° in this embodiment. $θ_S$ is the central angle occupied by the salient pole element 4c (see FIG. 4B) at the distal end of one stator salient pole, which is $θ_S ≈ 14°$ in this embodiment. As the winding is accommodated in the slot (groove) of the stator salient pole, $θ > θ_S$ naturally.

The optimum combination is one in which:

$$θ_S ≅ θ_P$$

holds because a magnetic flux generated by one N pole of the rotor magnet must efficiently reach the salient pole element at the distal end of the stator salient pole through the air gap. In other words, a magnetic circuit that minimizes leakage flux from the rotor magnet must be formed to consequently provide a motor having a good magnetic efficiency.

Inappropriate examples are as follows. If n=1, $θ_S (≈14°) << θ_P (=60°)$. Then, magnetic flux saturation undesirably occurs in the stator salient pole.

Conversely, if n=5 or a large n is set, $θ_P ≈ 6.7$, and $θ_S (≈14°) >> θ_P (≈6.7)$. Then, 14/6.7≈2 (pieces) of poles of the rotor magnet, i.e., a pair of N and S poles oppose simultaneously in the central angle $θ_S ≈ 14°$ occupied by one stator salient pole, and the N and S poles of the rotor magnet are magnetically short-circuited through the stator salient pole element, greatly degrading the magnetic efficiency. In this manner, if n takes too small or large a value, it is not preferable. It is preferable if n=2 or n=3. That is, the preferable ratio is N:M=2:3 or 2:5.

As has been described above, in the motor according to the present invention, the stator is formed by laminating stator yokes obtained by solely planar press punching, and two phases are formed in one plane. As a result, effects as follows are obtained.

(1) The magnetic balance between two phases accompanying rotor rotation is good, and vibrations do not occur in the axial direction accompanying excitation.

(2) Magnetic fluctuations between two phases do not take place structurally, with the result that the torque ripple is small, leading to high rotation precision.

(3) Since the magnetic circuit can be formed on one plane, a high magnetic efficiency can be obtained.

(4) While the conventional two-phase claw-pole motor has a high iron loss during high-speed rotation, the motor according to the present invention can greatly decrease the iron loss since it uses a lamination yoke.

(5) Variations among motors are small, so that: a high-precision motor having a stable quality can be manufactured at a low cost.

What we claim is:

1. A two-phase synchronous motor of radial gap structure comprising a ferromagnetic stator having N stator salient main poles and zero sub-poles, and a rotor magnet having M poles, wherein N and M are selected to be both even numbers so a relation N:M=2:2n−1 (n is a natural number) holds, said N stator salient main poles of said ferromagnetic stator are divided into first and second salient pole groups of N/2 stator salient poles on which windings are concentrically wound, each of said windings being wound around a lamination yoke made of soft magnetic material, said stator salient main poles belonging to said first and second salient pole groups are alternatively arranged in a circumferential direction of said stator, phases of said windings of said stator salient main poles belonging to said first and second salient pole groups are sequentially opposite to each other in the circumferential direction in units of groups, and said windings of said stator salient main poles belonging to said first and second salient pole groups are sequentially, electrically connected in the circumferential direction in units of groups to respectively form first and second phases, thereby providing a two-phase synchronous radial gap motor arrangement.

2. A two-phase synchronous motor of radial gap structure comprising a ferromagnetic stator having N stator salient poles and a rotor magnet having M poles, wherein N and M are selected to be both even numbers so a relation N:M=2:2n−1 (n is a natural number) holds, said N stator salient poles of said ferromagnetic stator are divided into first and second ferromagnetic salient pole groups of N/2 stator salient poles on which windings are concentrically wound, each of said windings being wound around a lamination yoke made of soft magnetic material, said stator salient poles belonging to said first and second salient pole groups are alternatively arranged in a circumferential direction of said stator, phases of said windings of said stator salient poles belonging to said first and second salient pole groups are sequentially opposite to each other in the circumferential direction in units of groups, and said windings of said stator salient poles belonging to said first and second salient pole groups are sequentially, electrically connected in the circumferential direction in units of groups to respectively form first and second phases, thereby providing a two-phase synchronous radial gap motor arrangement, wherein a relation $$\theta_S \cong \theta_P$$

holds where $\theta_S$ is the central angle forming a width of a salient pole element provided at a distal end of each of said stator salient pole and $\theta_P$ is the central angle of one pole of said rotor magnet, whereby magnetic flux saturation does not occur in the stator salient pole and whereby North and South poles of the rotor magnet are not short-circuited through the stator salient pole element.

3. A two-phase synchronous motor of radial gap structure comprising a ferromagnetic stator having N stator salient main Poles and zero sub-poles, and a rotor magnet having M poles, wherein N and M are selected to be both even numbers so a relation N:M=2:2n−1 (n is a natural number) holds, said N stator salient main poles of said ferromagnetic stator are divided into first and second ferromagnetic salient pole groups of N/2 stator salient poles on which windings are concentrically wound, each of said windings being wound around a lamination yoke made of soft magnetic material, said stator salient main poles belonging to said first and second salient pole groups are alternatively arranged in a circumferential direction of said stator, phases of said windings of said stator salient main poles belonging to said first and second salient pole groups are sequentially opposite to each other in the circumferential direction in units of groups, and said windings of said stator salient main poles belonging to said first and second salient pole groups are sequentially, electrically connected in the circumferential direction in units of groups to respectively form first and second phases, thereby providing a two-phase synchronous radial gap motor arrangement, wherein a ratio of the number N of said stator salient poles provided to said stator to the number M of said rotor magnet poles is set to be N:M=2:3.

4. A motor comprising a ferromagnetic stator having N stator salient poles and a rotor magnet having M poles, wherein N and M are selected to be both even numbers so a relation N:M=2:2n−1 (n is a natural number) holds, said N stator salient poles are divided into first and second salient pole groups of N/2 stator salient poles on which windings are concentrically wound, said stator salient poles belonging to said first and second salient pole groups are alternatively arranged in a circumferential direction of said stator, phases of said windings of said stator salient poles belonging to said first and second salient pole groups are sequentially opposite to each other in the circumferential direction in units of groups, and said windings of said stator salient poles belonging to said first and second salient pole groups are sequentially, electrically connected in the circumferential direction in units of groups to respectively form first and second phases, thereby providing a two-phase arrangement, wherein a ratio of the number N of said stator salient poles provided to said stator to the number M of said rotor magnet poles is set to be N:M=2:5.

* * * * *